E. A. MUNN & O. L. PLUMTREE.
DISTRIBUTING HOPPER.
APPLICATION FILED JUNE 9, 1910.

983,923.

Patented Feb. 14, 1911.
2 SHEETS—SHEET 1.

Witnesses:
McClelland Young
Lillian P. Fuchs

Inventors:
Edward A. Munn.
Oliver L. Plumtree.
By Barton & Folk, Attys

E. A. MUNN & O. L. PLUMTREE.
DISTRIBUTING HOPPER.
APPLICATION FILED JUNE 9, 1910.
983,923.
Patented Feb. 14, 1911.
2 SHEETS—SHEET 2.
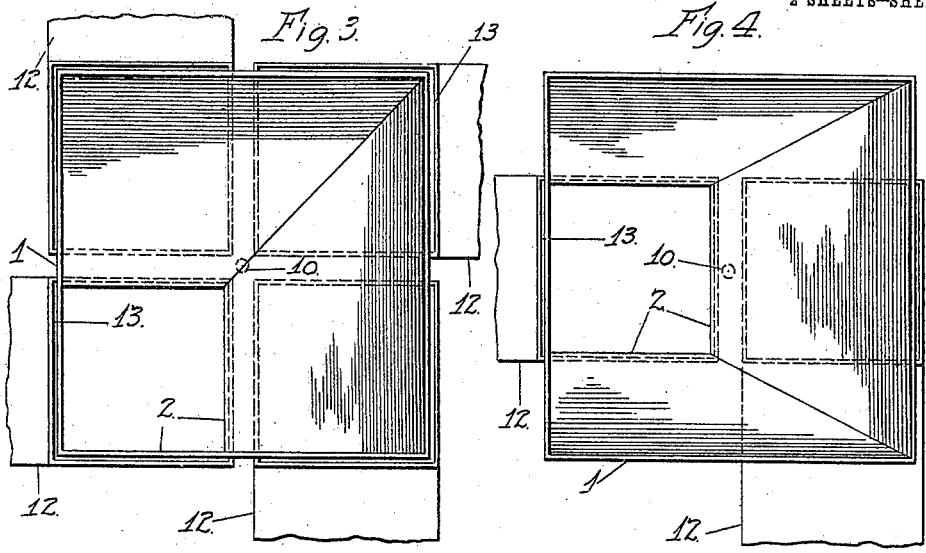
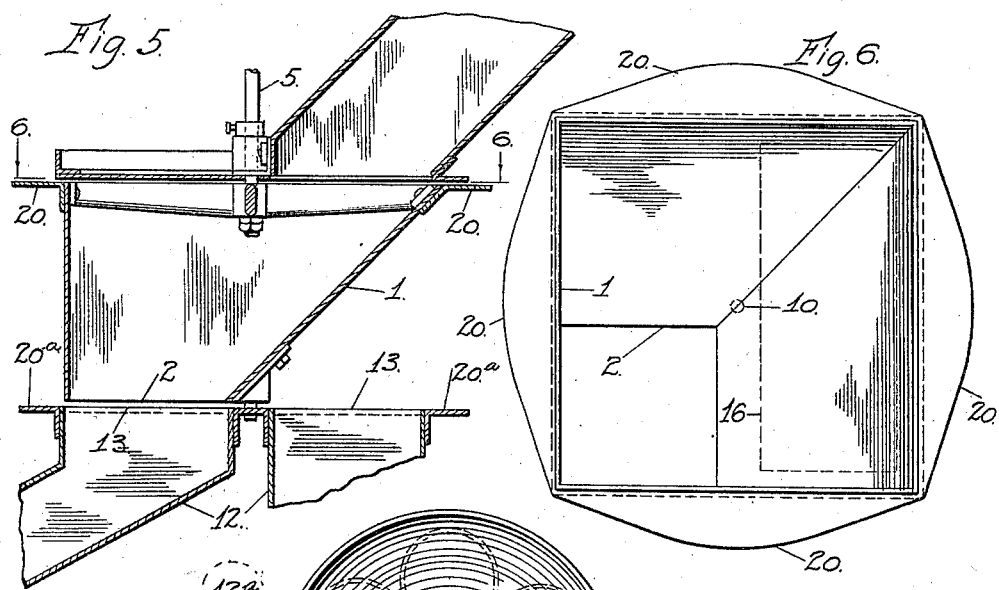
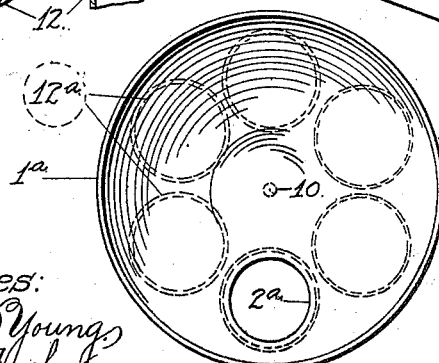
Witnesses:
McClelland Young
Lillian P. Fuchs
Inventors:
Edward A. Munn.
Oliver L. Plumtree.
By Barton & Folk, Attys.

UNITED STATES PATENT OFFICE.

EDWARD A. MUNN AND OLIVER L. PLUMTREE, OF CHICAGO, ILLINOIS; SAID PLUMTREE ASSIGNOR TO SAID MUNN.

DISTRIBUTING-HOPPER.

983,923.

Specification of Letters Patent. Patented Feb. 14, 1911.

Application filed June 9, 1910. Serial No. 565,945.

*To all whom it may concern:*

Be it known that we, EDWARD A. MUNN and OLIVER L. PLUMTREE, citizens of the United States, residing at Chicago, in the county of Cook and State of Illinois, have invented a certain new and useful Improvement in Distributing-Hoppers, of which the following is a full, clear, concise, and exact description.
Our invention relates to a distributing hopper for distributing grain or other material from an elevator or other source of supply. Its object is to provide a simple, compact and comparatively inexpensive device constituting an improvement over the ordinary distributing spout.

One feature of our invention relates to the provision of a distributing hopper in lieu of the usual distributing spout, said hopper being pivoted to rotate upon a vertical axis concentrically of the mouth of the hopper and said hopper having a discharge opening located eccentrically of the axis of rotation of the hopper. By such structure, the distributing hopper has comparatively little height and is yet nevertheless adapted to receive the grain or other material from a feed spout or pipe and deliver the same to any one of two or more pipes arranged below and concentrically with the axis of rotation of the hopper.

Other features of our invention relate to means for covering the mouth of the distributing hopper and the means whereby said hopper is supported and is adapted to be rotated.

Another feature of our invention, which it is advantageous in certain instances to employ, relates to the provision of means on the feed hopper whereby the hopper may be rotated to distribute grain to pipes, as for example, to pipes leading to grain receptacles, without interrupting the feeding of the grain into the hopper.
These and other features of our invention may be more readily understood by reference to the accompanying drawings in which—

Figure 1:
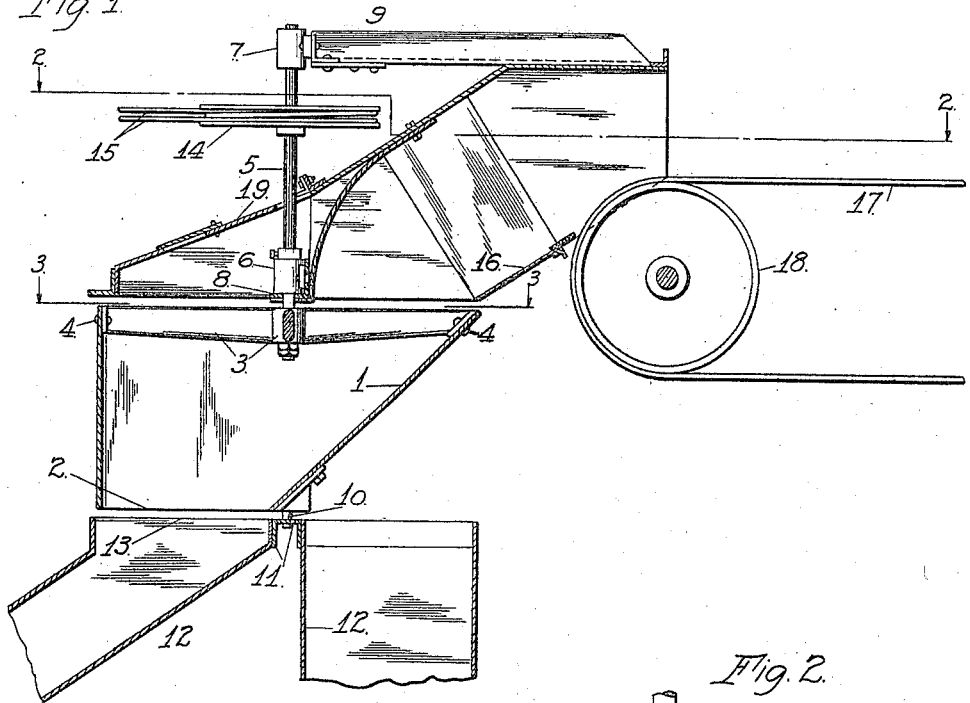
Figure 2:
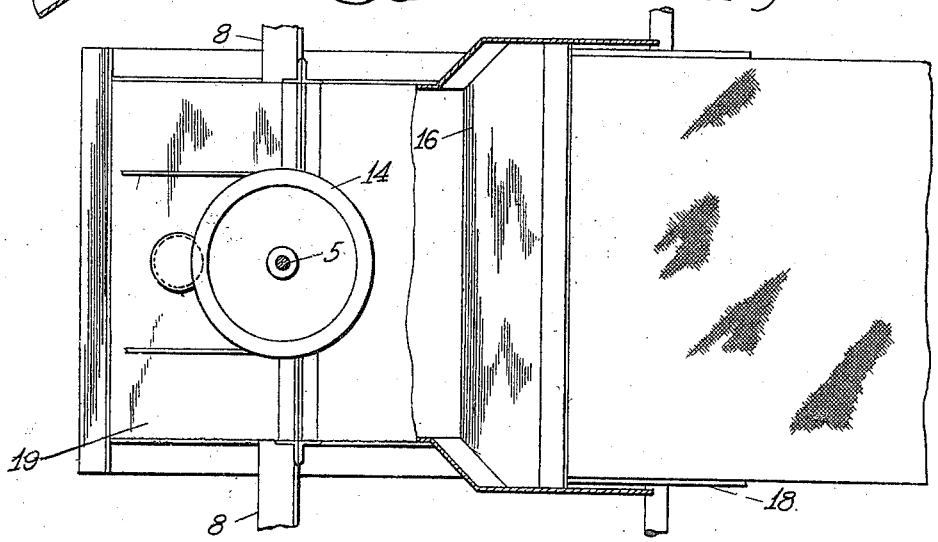

Figure 1 is a central, vertical section of a structure embodying the invention; Fig. 2 is a plan view on the line 2—2 of Fig. 1; Fig. 3 is a plan view on the line 3—3 of Fig. 1; Fig. 4 is a plan view of a modified form of the hopper adapted more particularly to distribute grain between only two pipes; Fig. 5 is a fragmentary, vertical section of a modified form of the invention wherein the hopper is adapted to be rotated without interrupting the feeding of grain thereinto;
Fig. 6 is a plan view of the hopper on the line 6—6 of Fig. 5; and Fig. 7 is a plan view of a modified form of hopper.

Figs. 1, 2 and 3 show a structure designed more particularly to distribute grain to four pipes leading to bins or other receptacles. In such preferred embodiment of our invention the feed hopper 1 has a mouth the periphery of which is in the form of a square. The discharge outlet 2 from said hopper is located immediately beneath one corner of the mouth of said hopper, the walls of said hopper converging from the mouth of said hopper toward said discharge outlet.

The feed hopper is mounted upon a spider 3, the outer ends or arms of said spider being secured by bolts 4, or in any other suitable manner, to the walls at the mouth of the hopper. Said spider and hence said hopper are suspended from the lower end of a vertical shaft 5. The shaft 5 has bearings 6 and 7 carried by supporting braces or brackets 8 and 9, respectively. The bottom of the hopper is provided with a guide or pivot pin 10 which projects through an opening in the bar 11, such pivot pin 10 serving as a guide to secure a more steady rotation of the feed hopper.

Arranged immediately below the feed hopper 1 are four pipes 12 which lead to the bins or other receptacles into which it is desired to discharge the grain. The bar 11 provides a support for the upper ends of said pipes 12. It will be observed that each of the pipes 12 is provided with a mouth 13 preferably corresponding to the shape of the discharge outlet 2 of the hopper 1. Said mouths 13 are located concentrically of the pin 10 at intervals of 90° so that by rotating said feed hopper one-quarter of a revolution the discharge outlet 2 thereof is brought from alinement with one of the mouths 13 into alinement with the next succeeding mouth 13.

The shaft 5 is provided with the usual pulley or sheave-wheel 14 actuated in a well-known manner by means of the cable 15 for rotating the shaft and thereby rotating the distributing hopper.

Arranged above and communicating with the mouth of the distributing hopper is a feed pipe 16 supported upon suitable frame work. The grain is delivered to said feed pipe 16 in any suitable manner, as for example, as shown in Fig. 1, by means of the usual traveling belt 17 carried by the pulley 18. Supported upon the pipe 16 is a hood or cover 19 fitting over the mouth of the feed hopper. Said cover 19 is preferably stationary, as shown in the drawings.

When the distributing hopper is designed to deliver grain to two pipes 12 only, said pipes are preferably arranged upon diametrically opposite sides of the pivotal point 10, and the outlet 2 of the hopper, instead of being arranged in one of the corners of the hopper, is preferably arranged centrally of one of the sides thereof, as shown in Fig. 4. By this arrangement the distribution of the grain from the hopper into one pipe 12 may be transferred to the other pipe 12 by one-half of a complete revolution of the hopper.

In some cases it is desirable to provide means whereby the hopper may be rotated from one pipe 12 to another while the grain or other material is being supplied to said hopper without having any of the material discharged from the feed pipe 16 outside of the mouth of the hopper. A structure designed to accomplish this is shown in Figs. 5 and 6 in which the mouth of the hopper is provided with a series of peripheral, horizontally extending flanges 20, and the pipes 12 are likewise provided with flanges $20^a$. In the normal distributing position of the hopper 1, the feed pipe 16 discharges directly into the mouth of the hopper, but, owing to the fact that the periphery of the hopper is in the form of a square and the lower end of the pipe 16 preferably has the cross section of a rectangle extending approximately across the entire side of the square (as indicated in dotted lines in Fig. 6), there will be times during the rotation of the hopper that some portions of the pipe 16 project outside of the mouth of the hopper. While the hopper is rotating, the flanges 20 and $20^a$ serve to catch the material which might otherwise be delivered by the pipe 16 upon the outside of the hopper, or by the hopper upon the outside of the pipes.

In Fig. 7 is shown a modified form of our invention in order to clearly indicate the fact that it is not essential that the mouth of the hopper or the discharge outlet thereof be in the form of a square. In said Fig. 7 the feed hopper $1^a$ is shown as of a funnel shape having a circular mouth, the funnel converging to a circular discharge outlet $2^a$ located eccentrically of the pivotal point 10 of the feed hopper. Such style of hopper is preferably used where more than four bin pipes $12^a$ are employed, said Fig. 7 showing a hopper designed to discharge the grain into any one of a plurality of circular bin pipes $12^a$.

Having thus described our invention, what we claim is:—

1. The combination with a distributing hopper having its discharge outlet located eccentrically of the mouth of the hopper, of a feed pipe having its discharge end positioned above the mouth of said hopper, an outwardly extending peripheral flange about the mouth of said hopper, and means for rotating said hopper about an axis concentric with said mouth.

2. The combination with a hopper having an enlarged square mouth and a constricted discharge outlet located eccentrically of said mouth, of a pipe for discharging material into said hopper, the discharge end of said pipe being of rectangular form and positioned immediately above the mouth of said hopper, a peripheral flange about the mouth of said hopper, and means for rotating said hopper about an axis concentric with said mouth.

3. The combination with a hopper having an enlarged mouth, of a spider concentric with said mouth and upon which said hopper is mounted, a rotary shaft from which said spider and hopper are suspended to rotate with the shaft, a pivot pin secured upon the bottom of said hopper, a cross brace having an opening for receiving said pin, and a plurality of pipes arranged concentrically of said pivot pin.

4. The combination with a hopper having an enlarged mouth and a constricted discharge outlet located eccentrically of said mouth, of a spider located concentrically of said mouth, said hopper being mounted on the ends of the arms of said spider, a rotary vertical shaft from which said spider and hopper are suspended to rotate with said shaft, a feed pipe supported above the mouth of said hopper, and a fixed cover for said hopper supported from said feed pipe.

In witness whereof, we hereunto subscribe our names this 6th day of June, A. D. 1910.

EDWD. A. MUNN.
OLIVER L. PLUMTREE.

Witnesses:
 ALFRED H. MOORE,
 GEORGE E. FOLK.